US008803711B1

(12) United States Patent
Gonring

(10) Patent No.: US 8,803,711 B1
(45) Date of Patent: Aug. 12, 2014

(54) SYSTEMS AND METHODS FOR DISPLAYING OPERATIONAL CHARACTERISTICS OF MARINE VESSELS

(75) Inventor: Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 283 days.

(21) Appl. No.: 13/016,495

(22) Filed: Jan. 28, 2011

Related U.S. Application Data

(60) Provisional application No. 61/385,348, filed on Sep. 22, 2010.

(51) Int. Cl.

| | |
|---|---|
| ***G08B 23/00*** | (2006.01) |
| ***G08G 3/00*** | (2006.01) |
| ***G08B 21/22*** | (2006.01) |
| ***B63H 25/36*** | (2006.01) |
| ***B60Q 1/26*** | (2006.01) |
| ***B60Q 1/44*** | (2006.01) |
| ***H05B 41/00*** | (2006.01) |
| ***G09F 9/33*** | (2006.01) |
| ***G08B 5/24*** | (2006.01) |

(52) U.S. Cl.
USPC ........... 340/984; 340/985; 340/986; 340/987; 340/468; 340/479; 340/641; 340/332; 340/815.45; 340/815.86; 440/1; 440/2

(58) Field of Classification Search
USPC .................................. 340/901–996; 114/338
See application file for complete search history.

(56) References Cited

U.S. PATENT DOCUMENTS

| | | | | | |
|---|---|---|---|---|---|
| 3,737,651 | A | | 6/1973 | Shute | |
| 3,870,875 | A | | 3/1975 | Altimus | |
| 4,121,140 | A | | 10/1978 | Jones | |
| 4,423,472 | A | | 12/1983 | Duthu | |
| 4,445,163 | A | | 4/1984 | Ziaylek, Jr. | |
| 4,453,163 | A | * | 6/1984 | Garner et al. | 340/980 |
| 4,459,115 | A | * | 7/1984 | Ballard | 440/2 |
| 4,903,007 | A | | 2/1990 | Gottlieb | |
| 4,917,061 | A | | 4/1990 | Nagakura | |
| 4,929,943 | A | * | 5/1990 | Baldwin | 340/984 |
| 4,954,932 | A | | 9/1990 | Isenga | |
| 4,970,493 | A | * | 11/1990 | Yim | 340/468 |
| 5,047,747 | A | | 9/1991 | Gottlieb | |
| 5,063,381 | A | * | 11/1991 | Ito | 340/984 |
| 5,080,619 | A | | 1/1992 | Uchida et al. | |
| 5,142,457 | A | | 8/1992 | Wehner | |
| 5,230,643 | A | | 7/1993 | Kanno | |
| 5,268,824 | A | | 12/1993 | Czipri | |
| 5,416,670 | A | | 5/1995 | Authier | |
| 5,448,234 | A | | 9/1995 | Harwood | |
| 5,537,299 | A | | 7/1996 | Perry | |
| 5,594,415 | A | * | 1/1997 | Ishikawa et al. | 340/467 |
| 5,595,441 | A | | 1/1997 | McGee | |
| 5,601,058 | A | | 2/1997 | Dyches et al. | |
| 5,613,886 | A | | 3/1997 | Cribbs | |

(Continued)

*Primary Examiner* — Steven Lim
*Assistant Examiner* — Muhammad Adnan
(74) *Attorney, Agent, or Firm* — Andrus Intellectual Property Law, LLP

(57) ABSTRACT

An indicator device on a marine vessel is configured to display motion. A controller operates the indicator device according to at least a first mode wherein the indicator device displays motion and a second mode wherein the indicator device does not display motion. The controller operates the indicator device based upon an operational characteristic of the marine vessel to thereby inform a swimmer located proximate to the marine vessel of the operational characteristic.

9 Claims, 7 Drawing Sheets

(56) References Cited

U.S. PATENT DOCUMENTS

| | | | | |
|---|---|---|---|---|
| 5,636,916 | A * | 6/1997 | Sokolowski | 362/477 |
| 5,719,552 | A | 2/1998 | Thompson | |
| 5,831,523 | A * | 11/1998 | Lange | 340/479 |
| 5,905,434 | A * | 5/1999 | Steffan et al. | 340/464 |
| 5,923,124 | A * | 7/1999 | Paech | 315/80 |
| 6,200,009 | B1 | 3/2001 | Schulte | |
| 6,424,267 | B1 | 7/2002 | Schell | |
| 6,446,593 | B1 | 9/2002 | Suganuma | |
| 6,492,963 | B1 * | 12/2002 | Hoch | 345/39 |
| 6,634,774 | B2 | 10/2003 | Redding | |
| 6,850,152 | B1 * | 2/2005 | Woodall et al. | 340/332 |
| 6,969,287 | B1 | 11/2005 | Motsenbocker | |
| 7,095,318 | B1 * | 8/2006 | Bekhor | 340/485 |
| 7,247,063 | B2 | 7/2007 | Lemchen | |
| 2003/0231108 | A1 * | 12/2003 | Welch | 340/463 |
| 2004/0169969 | A1 | 9/2004 | Takeda | |
| 2006/0083011 | A1 * | 4/2006 | Buhr et al. | 362/466 |
| 2006/0273891 | A1 * | 12/2006 | Quach et al. | 340/467 |
| 2007/0049137 | A1 * | 3/2007 | Lemchen | 440/2 |
| 2009/0174538 | A1 * | 7/2009 | Shibata et al. | 340/438 |

* cited by examiner

SYSTEMS AND METHODS FOR DISPLAYING OPERATIONAL CHARACTERISTICS OF MARINE VESSELS

CROSS-REFERENCE TO RELATED APPLICATION

The present application claims priority of U.S. Provisional Patent Application No. 61/385,348, filed Sep. 22, 2010, which is hereby incorporated herein by reference.

FIELD

The present disclosure relates to marine vessels, and display systems and methods for marine vessels.

BACKGROUND

U.S. Pat. No. 7,247,063 is hereby incorporated herein by reference and discloses apparatuses for warning a swimmer in the proximity of a marine vessel that a propeller associated with the vessel is rotating.

SUMMARY

An indicator device on a marine vessel is configured to display motion. A controller operates the indicator device according to at least a first mode wherein the indicator device displays motion and a second mode wherein the indicator device does not display motion. The controller operates the indicator device based upon an operational characteristic of the marine vessel to thereby inform a swimmer located proximate to the marine vessel of the operational characteristic.

DETAILED DESCRIPTION

Figure 1:
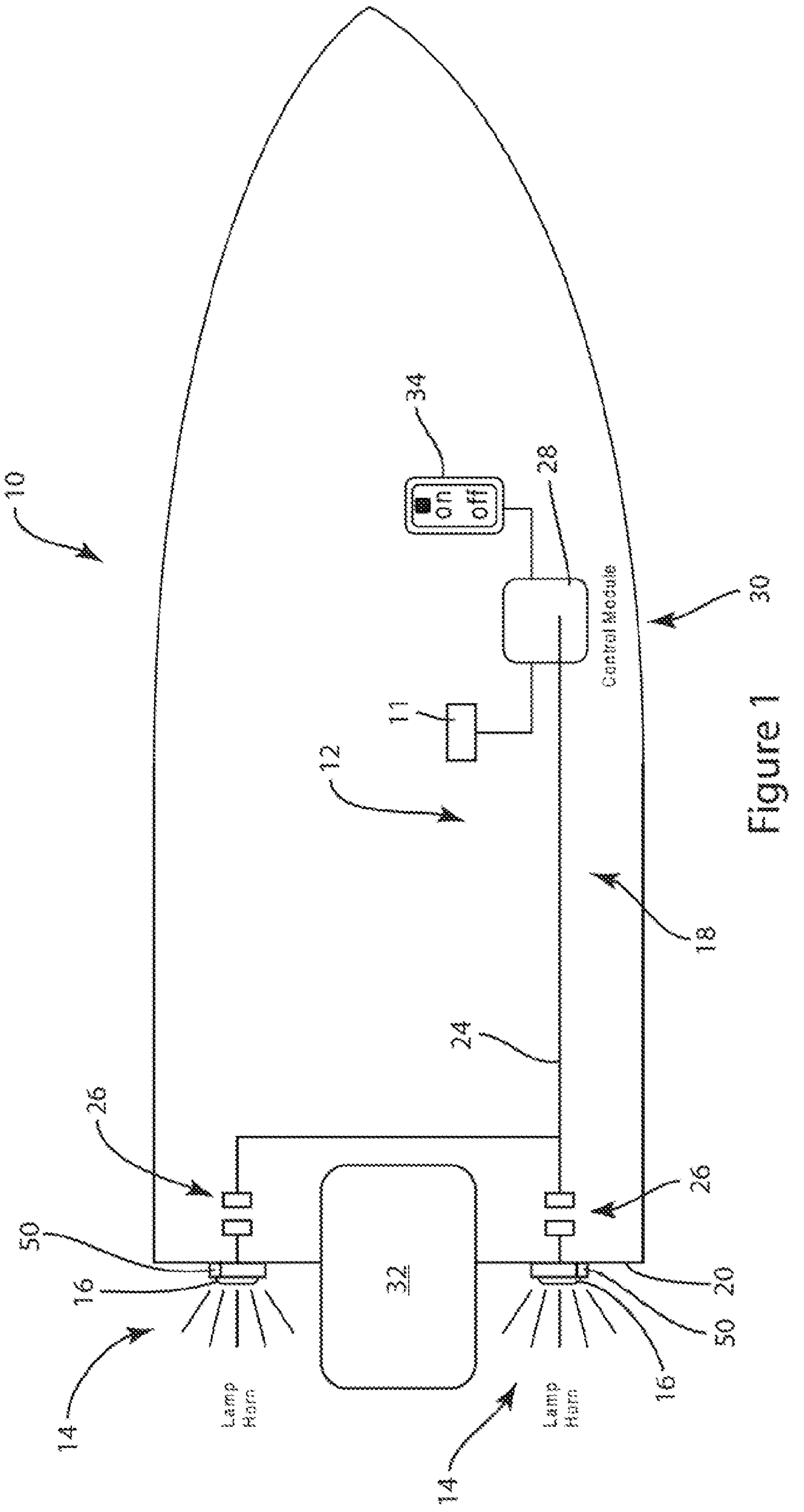
FIG. 1 is a schematic depiction of one example of a marine vessel having a display system for displaying motion based on an operational characteristic of the marine vessel.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms “means for” or “step for” are explicitly recited in the respective limitation.

FIGS. 1-7 depict various examples of marine vessels 10 and display systems 12. The display systems 12 display motion based on one or more operational characteristics of the marine vessels 10 to one or more swimmers located proximate to the respective marine vessel. As explained further herein, the display systems 12 include at least one indicator device 14 that displays such motion on a visual display 16 and at least one control system or “controller” 18 that is configured to control operation of the indicator device(s) 14. When the display system 12 is operating, the controller 18 operates each indicator device 14 according to at least a first mode wherein the indicator device 14 displays motion on the visual display 16 and a second mode wherein the indicator device 14 does not display motion on the visual display 16. In the first mode, the indicator device 14 displays motion to a swimmer located proximate to the marine vessel 10 by for example illuminating a plurality of lights in a sequence or by for example displaying a virtual rotating propeller. Other means for displaying motion and means for controlling a display of motion are possible, as would be recognized by one having ordinary skill in the art. In the second mode, the indicator device 14 does not display motion to the swimmer, and can for example display solid or flashing lights.

The controller 18 operates each indicator device 14 in the first mode when a selected “operational characteristic” of the marine vessel 10 is directly or indirectly sensed and in the second mode when the operational characteristic is not directly or indirectly sensed. The operational characteristic can be, for example, whether or not a propeller associated with the marine vessel 10 is rotating. When a propeller is determined to be rotating, the controller 18 operates the indicator device 14 in the first mode, thereby displaying motion on the visual display 16. When it is determined that the propeller is not rotating, the controller 18 operates the indicator device in the second mode in which motion is not displayed on the visual display 16. Operational characteristics other than propeller rotation can be considered and acted upon by the controller 18, as will be discussed further herein.

The marine vessels 10 depicted in the Figures are maneuvered by a propulsion device 32, which among other things includes an outboard motor; however, the concepts in the present disclosure are applicable to marine vessels having any type of or configuration of propulsion device(s), including but not limited to electric motors, internal combustion engines, and/or hybrid systems configured as one or more inboard drives, outboard drives, inboard/outboard drives, stern drives, and/or the like. The propulsion device(s) could include propellers, impellers, pod drives, and/or the like.

Figure 2:
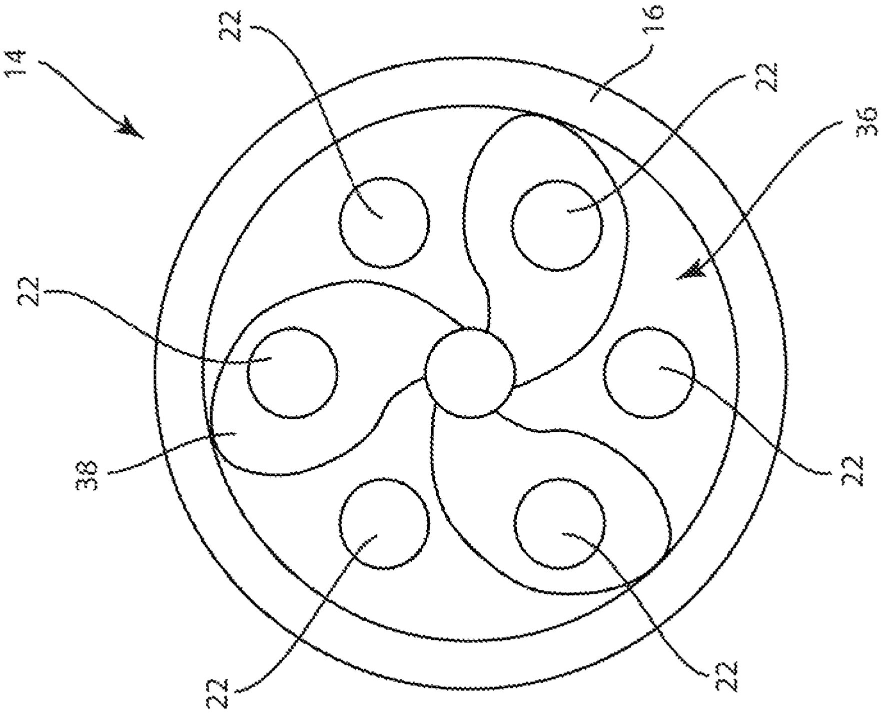
FIG. 2 is an example of a visual display in a display system for a marine vessel.

FIGS. 1 and 2 depict an example of a display system 12 as an aftermarket component for a marine vessel 10. The display system 12 includes a pair of indicator devices 14 mounted on the stern 20 of the marine vessel 10 so as to be viewable by swimmers in the water proximate the stern 20. The number, location, and configuration of the indicator devices 14 can differ from that shown and can be mounted to other parts of the marine vessel 10 (above the water line and/or below the water line) so as to be viewable by swimmers in the water. Each indicator device 14 has a visual display 16, which in the example shown in FIG. 2 includes a plurality of lights 22. The type and configuration of the plurality of lights 22 can vary from that shown and described. In the examples shown, the plurality of lights 22 are light emitting diodes mounted on a printed circuit board. Each light in the plurality of lights 22 can be configured to emit the same or a different color and/or intensity from other lights in the plurality of lights 22. The plurality of lights 22 and electrical connections thereof can be designed for outdoor and under-water use. The respective electrical connections for the plurality of lights 22 can include 12-volt power, ground and signal.

As shown in FIG. 2, the visual display 16 can optionally include an outline or design of a propeller 38 thus visually associating the visual display 16 with a propeller of the marine vessel 10. The outline or design of the propeller 38 can optionally be formed with illuminating paint or other material or device that glows in the dark for better viewing at nighttime hours.

Each indicator device 14 is connected to a controller 18, which in the example shown in FIG. 1 includes a programmable control network 24 having one or more microprocessors and/or one or more control modules that communicate with each other to control operation of the display system 12. In the example shown in FIG. 1, a microprocessor 26 is located with or proximate to each indicator device 14 and communicates with a control module 28 located with or proximate to a helm 30 of the marine vessel 10 via the control network 24. The particular type and configuration of control network 24 can vary from that shown and described. The control network 24 can include for example a controller-area network (CAN) including a vehicle bus configured to allow the respective microcontrollers, control modules, and other devices in the display system 12 to communicate with each other. Alternately, the control network 24 can be a non-CAN-based network that functions based upon discrete analog inputs. Again, the exact type of controller 18 is not critical as long as functional aspects of the display system 12 described herein are facilitated.

The controller 18 is configured to directly or indirectly monitor operational characteristics of the marine vessel 10. For example, the controller 18 can be configured to directly or indirectly monitor whether one or more propulsion devices 32 associated with the marine vessel 10 are off, cranking, or running, and/or whether one or more transmissions associated with the propulsion devices 32 are in forward, reverse or neutral gear. In a further example, the controller 18 can be configured to directly or indirectly recognize the rate and/or direction (i.e., clockwise or counterclockwise) at which a propeller associated with the propulsion device 32 is turning. In the particular example shown, the controller 18 is configured to monitor a key switch crank signal to thereby determine whether an engine associated with the propulsion device 32 is cranking. The controller 18 is further configured to monitor an engine tachometer signal and neutral switch associated with the propulsion device 32 to thereby determine when the engine is running and in reverse, neutral or forward gear positions. From the tachometer signal, the controller 18 can also be configured to determine the rate of propeller rotation. From the neutral switch or sensor the controller 18 can also be configured to determine the direction of propeller rotation. However these controller configurations are merely exemplary and as stated above the controller 18 can instead or also be configured to receive direct feedback regarding particular operational characteristics of the marine vessel 10 via for example sensors (an example of which is shown schematically at 11). Further examples of control systems for directly and/or indirectly sensing operational characteristics of marine vessels will be understood by one having ordinary skill in the art and are therefore not further described herein; however one example of such a system is described in U.S. Pat. No. 7,247,063, which has been incorporated herein by reference.

An on/off switch 34 is located at the helm 30 and is in communication with the control module 28 to allow a user to manually turn the display system 12 on and off. As discussed above, when the display system 12 is turned on, the controller 18 is configured to operate the visual display 18 in at least the noted first and second modes. Although not shown, additional user input and display devices can be provided at the helm 30 or elsewhere to allow the user to control and view features of the display system 12, including but not limited to display panels, touch screens, keypads, and the like.

Figure 3:
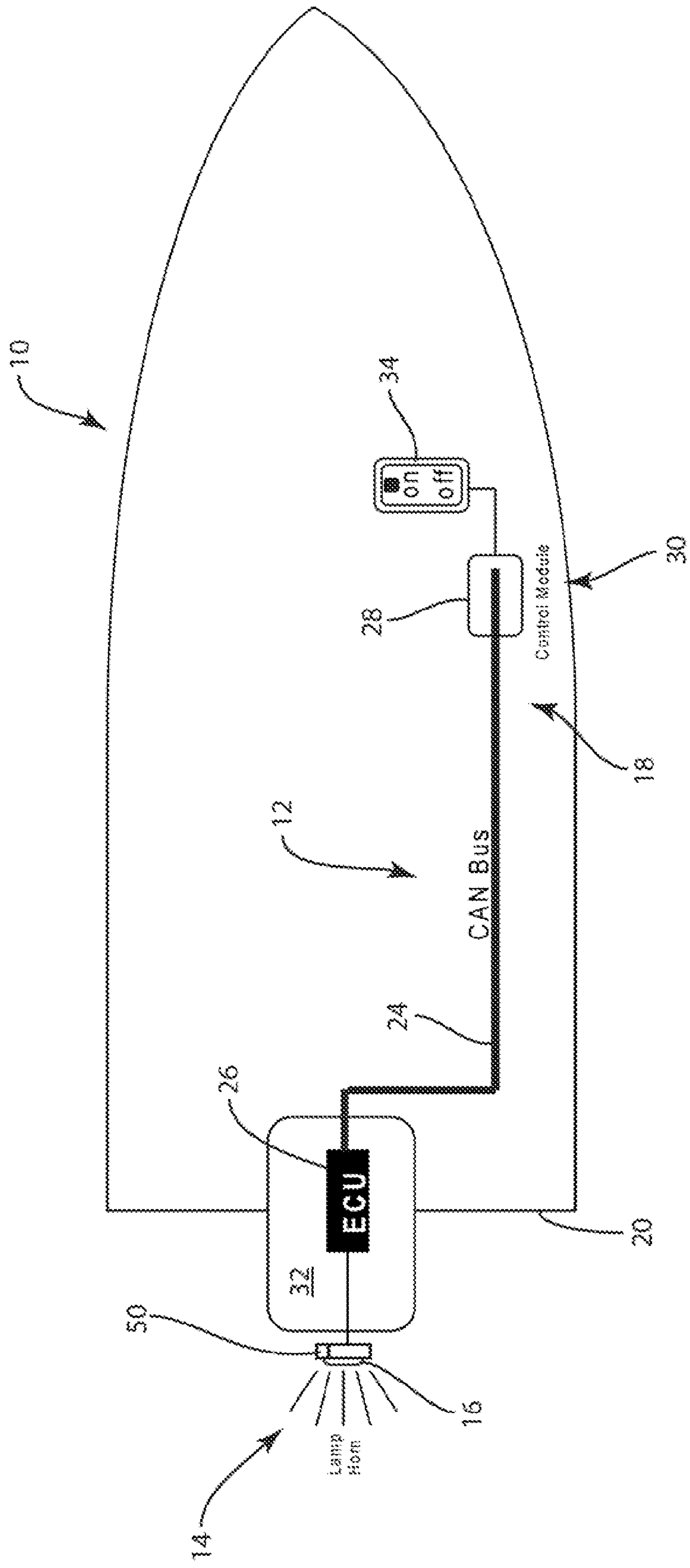
FIG. 3 is a schematic depiction of another example of a marine vessel having a display system for displaying motion based on an operational characteristic of the marine vessel.

FIG. 3 depicts another example wherein the display system 12 is integrated with the marine vessel 10. In this example, the microprocessor 26 is integrated with or part of an engine control unit (ECU) of the propulsion device 32 and the indicator device 14 is located on the rear of the propulsion device 32. Again, the particular arrangement of the display system 12, whether integrated or not, can vary from that shown and described.

Figure 4:
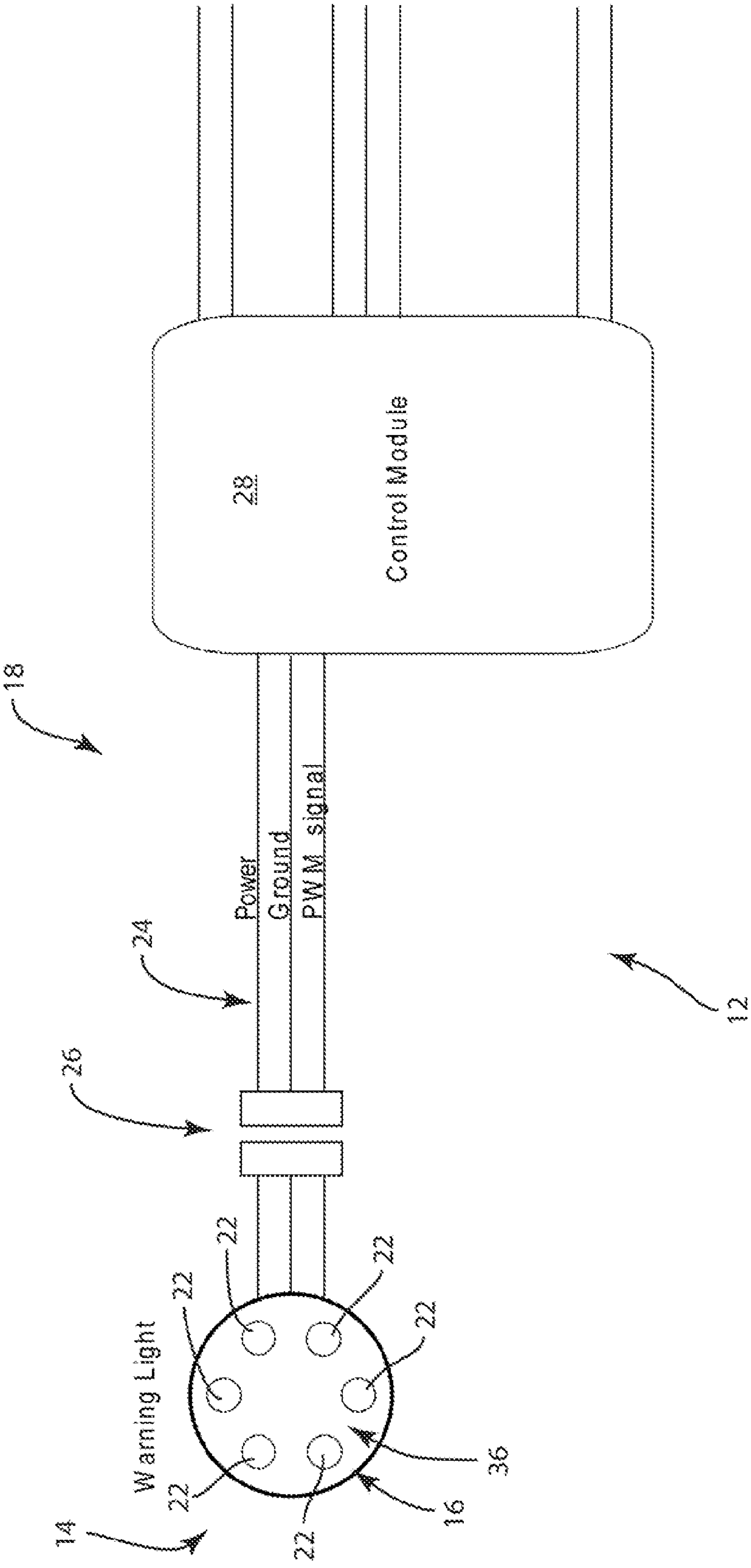
FIG. 4 is a schematic depiction of one example of a display system for displaying motion based on an operational characteristic of a marine vessel.

FIG. 4 depicts an example of the display system 12. In this example, the visual display 16 of the indicator device 14 includes an array of lights 36. The controller 18 is configured to light the array of lights 36 in a predetermined sequence to thereby display motion when a certain operational characteristic of the marine vessel 10 is directly or indirectly recognized. In the example shown, the array of lights 36 forms a substantially circular pattern and the sequence can be either clockwise or counterclockwise along the circular pattern, thus displaying motion that a user can correlate to an operational characteristic of the marine vessel 10, such as for example the rotating state of a propeller associated with the propulsion device 32. The direction of the sequence can optionally correspond to the direction of rotation of a propeller associated with the propulsion device 32, thus correspondingly displaying in a visual display a condition of forward and reverse propeller rotation. These examples thus provide systems and methods for notifying swimmers or other individuals in the vicinity of the propulsion device 32 as to whether propeller(s) associated with the propulsion device 32 are or are not rotating, and optionally the direction (e.g., forward or reverse) of such rotation.

Figure 5:
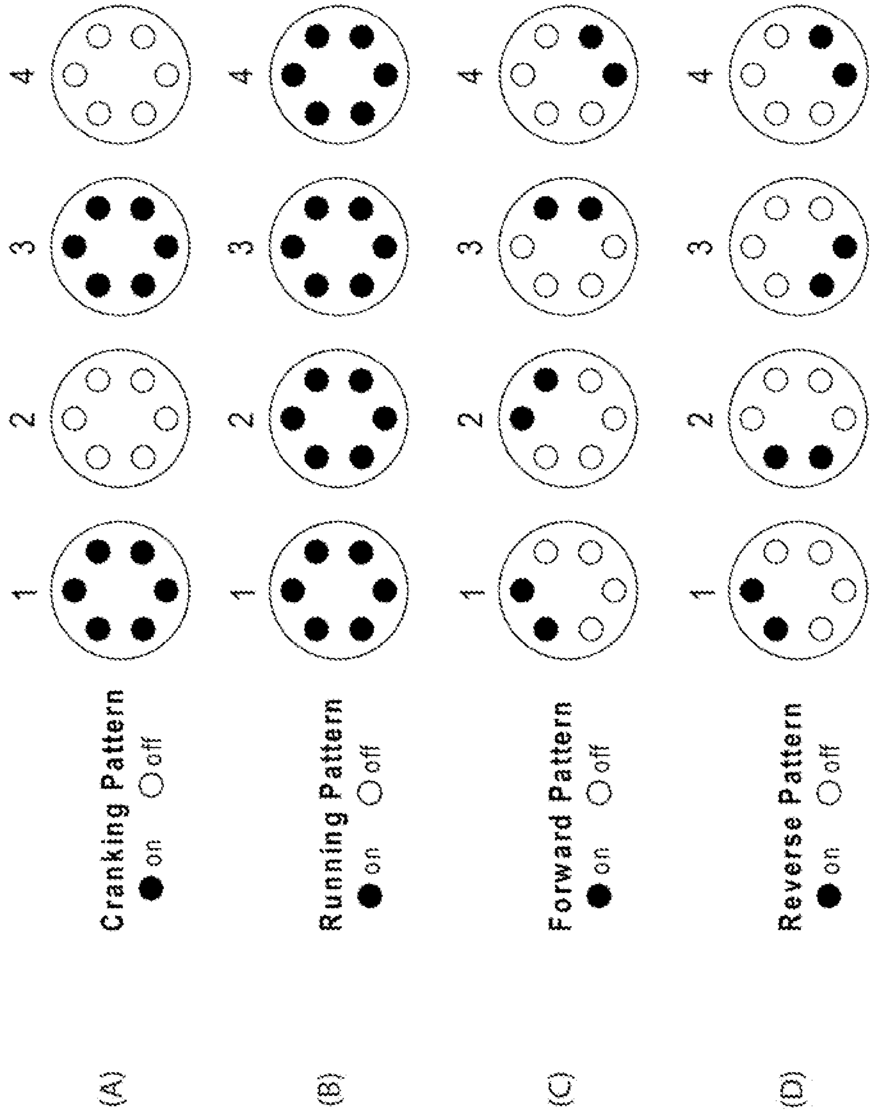
FIG. 5 is a schematic depiction of exemplary modes of a visual display in a display system for a marine vessel.

FIG. 5 depicts four exemplary sequences that can be displayed on the visual display 16 shown in FIG. 4 based upon four different operational characteristics (A-D) of the marine propulsion device 32, including a cranking state of an engine associated with the propulsion device 32 (characteristic A), an engine-running state of the marine propulsion device 32 (characteristic B), a forward rotation of a propeller associated with the marine propulsion device 32 (characteristic C) and a reverse rotation of a propeller associated with the marine propulsion device 32 (characteristic D). Each exemplary sequence is represented by four sequential time intervals (1-4) typically having the same duration for the particular characteristic. As explained below, when characteristics A and B are determined, the controller 18 operates the indicator device 14 according to the noted second mode of operation wherein motion is not displayed. When characteristics C and D are determined, the controller 18 operates the indicator device 14 according to the noted first mode of operation wherein motion is displayed. The duration of each time interval (1-4) is not critical and can be for example relatively short (e.g., less than or equal to one half of a second) or relatively long (e.g., greater than one half of a second). For discussion purposes, characteristics A and B each have four equal time intervals (1-4), that are 100 milliseconds second in length. Characteristics C and D each have four equal time intervals (1-4) that are 200 milliseconds in length.

In Example A, the operational characteristic of the marine vessel 10 is a cranking state of an engine associated with the propulsion device 32. In this example, the controller 18 is programmed to cause the array of lights 36 to uniformly flash on and off (i.e., on in intervals 1 and 3 and off in intervals 2 and 4), thus providing a flashing display of light.

In Example B, the operational characteristic of the marine vessel 10 is an engine-running state of the marine propulsion device 32. In this case, the controller 18 is programmed to cause the array of lights 36 to uniformly remain lit, thus providing a continuous display of light.

In Example C, the operational characteristic of the marine vessel 10 is forward rotation of a propeller associated with the marine propulsion device 32. In this case, the controller 18 is programmed to cause the array of lights 36 to light in a correspondingly forward sequence during the intervals 1-4, thus displaying motion in the form of a forward (clockwise) sequence around the array of lights 36.

In Example D, the operational characteristic of the marine vessel 10 is reverse rotation of a propeller associated with the marine propulsion device 32. In this case, the controller 18 is programmed to cause the array of lights 36 to light in a correspondingly reverse sequence during intervals 1-4, thus displaying motion in the form of a reverse (counterclockwise) sequence around the array of lights 36.

According to examples A and B, the controller 18 operates the indicator device 14 so that motion is not displayed on the visual display 16. Once forward or reverse rotation of the propeller is determined in examples C and D, respectively, the controller 18 is configured to operate each indicator device 14 so as to display motion on the visual display 16 in the form of a sequence of illuminated lights.

The display system 12 can also display motion based upon other types of operational characteristics of the marine vessel 10 from that described above. For example, the display system 12 can display motion to indicate engine trouble, S.O.S., and the like.

In another example, the controller 18 can be programmed to turn the indicator device(s) 14 off once the marine vessel 10 is underway and has reached a predetermined speed. Also, the controller 18 can be programmed to turn the indicator device(s) 14 on once the marine vessel 10 slows down to a predetermined speed. For example, when a tachometer signal associated with the propulsion device 32 indicates an engine speed greater than 2500 rpm, the controller 18 can be programmed to assume that the marine vessel 10 is underway and therefore disable the display system 12. The rpm threshold can be applied with a time threshold such that the engine speed must be greater than the rpm threshold for more than a predetermined amount of time. The controller 18 can be programmed to keep the display system 12 disabled until the tachometer signal indicates an engine speed under 1000 rpm. In a further example, when an engine associated with the propulsion device 32 is not running or cranking, the controller 18 can be programmed to turn off the indicator device(s) 14. As stated above, the indicator device(s) 14 can alternately be manually turned on and off by a user via the dash mounted on/off switch 34.

Figure 6:
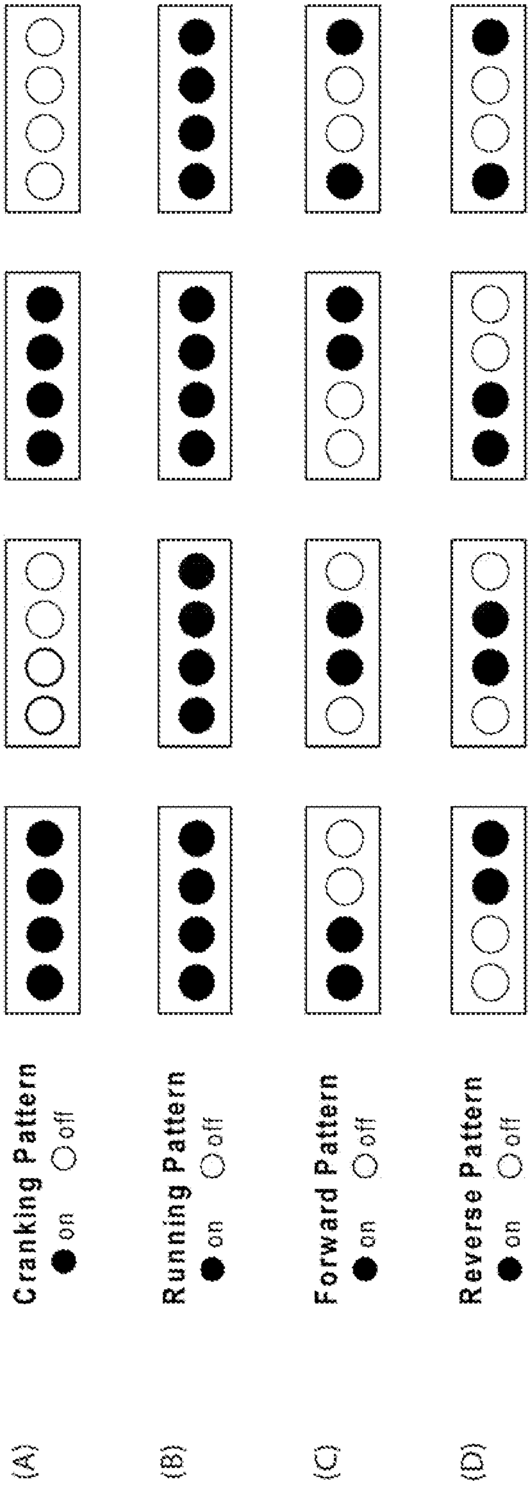
FIG. 6 is a schematic depiction of exemplary modes of another example of a visual display in a display system for a marine vessel.

FIG. 6 depicts another four exemplary sequences presented based upon four operational characteristics (A-D) of the marine vessel 10. In this example the visual display 16 that includes an array of lights 36 formed in a substantially straight pattern (as opposed to the circular pattern shown in FIG. 5).

In Example A, the operational characteristic of the marine vessel 10 is a cranking state of an engine associated with the propulsion device 32. In this example, the controller 18 is programmed to cause the array of lights 36 to uniformly flash on and off (i.e., on in intervals 1 and 3 and off in intervals 2 and 4), thus providing a flashing display of light.

In Example B, the operational characteristic of the marine vessel 10 is an engine-running state of the propulsion device 32. In this case, the controller 18 is programmed to cause the array of lights 36 to uniformly remain lit, thus providing a continuous display of light.

In Example C, the operational characteristic of the marine vessel 10 is forward rotation of a propeller associated with the propulsion device 32. In this case, the controller 18 is programmed to cause selected lights in the array of lights 36 to light in a correspondingly forward (left to right) sequence during the intervals 1-4, thus displaying motion in the form of a forward (right to left) sequence along the array of lights 36.

In Example D, the operational characteristic of the marine vessel 10 is reverse rotation of a propeller associated with the propulsion device 32. In this case, the controller 18 is programmed to cause the array of lights 36 to light in a correspondingly reverse (right to left) sequence during intervals 1-4, thus displaying motion in the form of a reverse (right to left) sequence along the array of lights 36.

According to examples A and B, the controller 18 operates the indicator device 14 so that motion is not displayed on the visual display 16. Once forward or reverse rotation of the propeller is determined in examples C and D, respectively, the controller 18 is configured to operate each indicator device 14 so as to display motion on the visual display 16 in the form of a sequence of illuminated lights.

Figure 7:
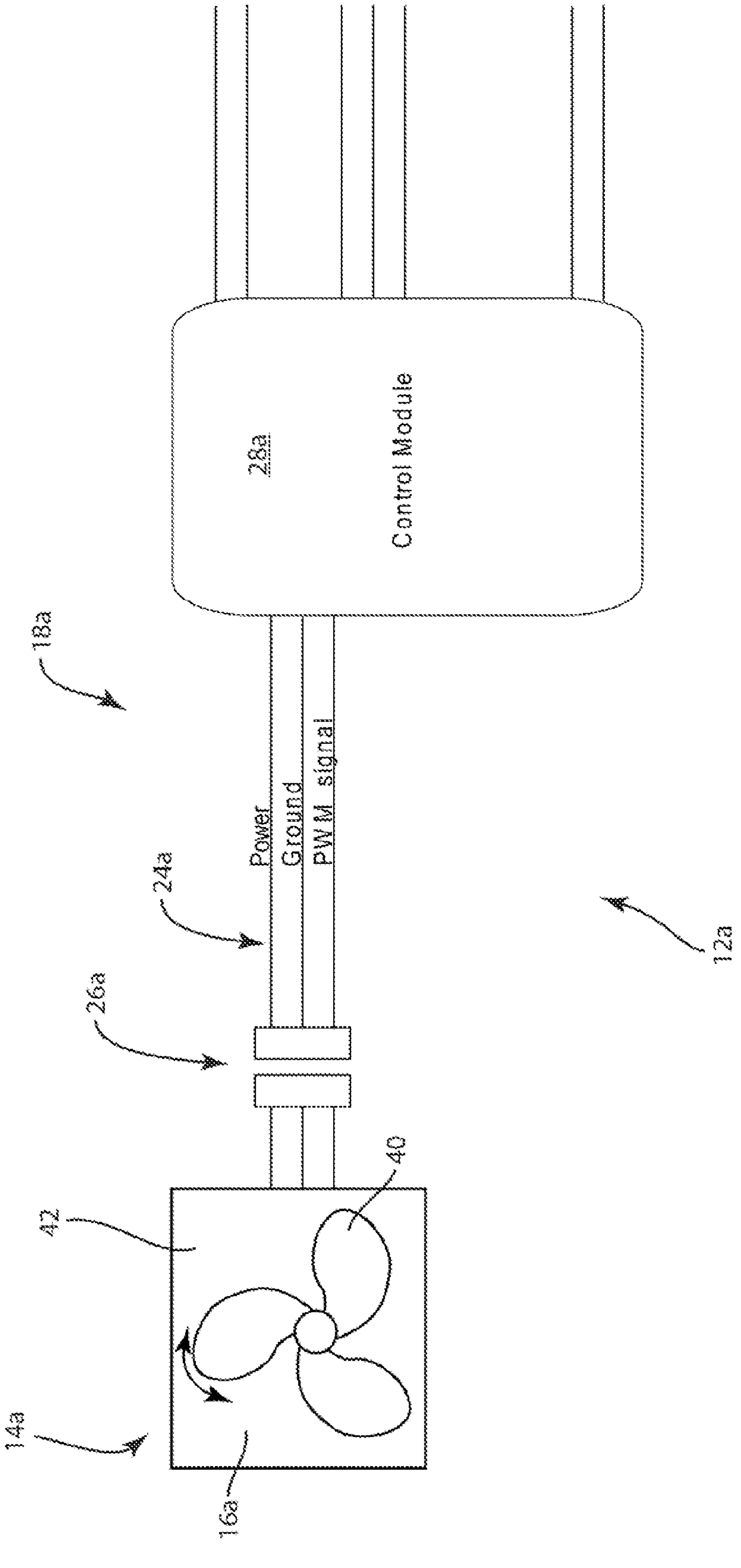
FIG. 7 is a schematic depiction of another example of a display system for displaying motion based on an operational characteristic of a marine vessel.

FIG. 7 depicts another example of a display system 12*a*. In this example, the visual display 16*a* of the indicator device 14*a* includes a video screen 42. In this example, the controller 18*a* is configured to operate the video screen 42 to display motion when an operational characteristic of the marine vessel 10 is recognized. For example, the controller 18*a* causes the visual display 16*a* to display a virtual rotating propeller 40 whenever it is determined by the controller 18*a* that an actual propeller associated with the propulsion device 32 is rotating. The direction and/or speed of the virtual rotating propeller 40 can correspond to the actual direction and/or speed of rotation of an actual propeller associated with the propulsion device 32. Other alternatives are possible for visually displaying motion in association with any particular operational characteristic of the marine vessel 10 and specifically the propulsion device(s) 32 associated with the marine vessel 10.

In another example, each indicator device 14 can be operated in accordance with data from one or more ambient light sensors 50 configured to detect ambient light conditions in which the marine vessel 10 exists. The ambient light sensor(s) 50 can be located with or proximate to the indicator device 14 or alternately can be located elsewhere on the marine vessel 10. The detected ambient light condition is communicated to the controller 18, which is configured to adjust the brightness of the visual display 16 based upon the ambient light conditions. For example, the brightness of the visual display 16 can be decreased when ambient light conditions become darker. This example is particularly useful to prevent visual interference with navigation or other operational lights on the marine vessel 10.

What is claimed is:

1. A display system for a marine vessel, the display system comprising:

an indicator device comprising a circular array of lights; and a controller that operates the indicator device according to at least a first mode wherein the lights in the array are sequentially lit so as to display a circular pattern of motion around the circular array of lights and a second mode wherein the lights in the circular array are not sequentially lit so as not to display the circular pattern of motion;

wherein the controller operates the indicator device according to the first mode when the controller determines that a propeller on the marine vessel is rotating and wherein the controller operates the indicator device according to the second mode when the controller determines that the propeller is not rotating;

wherein the circular array of lights is visible to a swimmer located proximate to a propulsion device for the marine vessel; and wherein the circular pattern of motion is clockwise when rotation of the propeller is clockwise and wherein the circular pattern of motion is counter-clockwise when rotation of the propeller is counter-clockwise.

2. The display system according to claim 1, wherein the controller operates the indicator device to dim the circular array of lights based upon ambient light conditions.

3. The display system according to claim 1, comprising an input device for inputting as user-requested operating condition of the display system.

4. The display system according to claim 1, wherein the controller determines that the propeller is rotating based upon an operational characteristic of a marine propulsion device on the marine vessel.

5. The display system according to claim 4, wherein the operational characteristic comprises engine speed of the marine propulsion device.

6. The display system according to claim 5, wherein the operational characteristic comprises gear state of the marine propulsion device.

7. The display system according to claim 1, wherein the indicator device further comprises a depiction of a propeller.

8. A method of displaying an operational characteristic of a marine vessel, the method comprising:

providing an indicator device on the marine vessel, the indicator device comprising a circular array of lights that are visible to a swimmer located proximate a propulsion device for the marine vessel;

determining whether a propeller of the propulsion device is rotating;

sequentially lighting lights in the circular array of lights in a circular pattern around the circular array so as to display circular motion to the swimmer; and sequentially lighting the lights in a clockwise circular pattern when the rotational state of the propeller is clockwise and sequentially lighting the lights in a counter-clockwise circular pattern when the rotational state of the propeller is counter-clockwise.

9. The method according to claim 8, comprising dimming the circular array of lights based upon ambient conditions.

* * * * *